United States Patent [19]

Spector

[11] Patent Number: 4,965,410

[45] Date of Patent: Oct. 23, 1990

[54] DAM FOR SHIELD TERMINATORS

[75] Inventor: Robert J. Spector, Medford, Mass.

[73] Assignee: Minnesota Mining and Manufacturing Company, St. Paul, Minn.

[21] Appl. No.: 307,391

[22] Filed: Feb. 6, 1989

[51] Int. Cl.[5] ............ H02G 15/02

[52] U.S. Cl. ............ 174/78; 174/77 R; 439/98

[58] Field of Search ............ 174/76, 77 R, 78; 439/98, 99

[56] References Cited

U.S. PATENT DOCUMENTS

| | | | |
|---|---|---|---|
| 3,209,067 | 9/1965 | Channell et al. | 174/93 |
| 3,243,211 | 3/1966 | Wetmore | 287/78 |
| 3,305,625 | 2/1967 | Ellis | 174/84 R |
| 3,312,772 | 4/1967 | Sherlock | 174/75 C |
| 3,316,343 | 4/1967 | Sherlock | 174/84 R |
| 3,360,631 | 12/1967 | Hess | 219/85 |
| 3,396,455 | 8/1968 | Sherlock | 29/498 |
| 3,396,460 | 8/1968 | Wetmore | 29/629 |
| 3,525,799 | 8/1970 | Ellis | 174/84 R |
| 3,541,495 | 11/1970 | Ellis et al. | 439/578 |
| 3,984,623 | 10/1976 | Worden | 174/138 F |
| 4,032,205 | 6/1977 | Taj | 174/78 X |
| 4,079,193 | 3/1978 | Channell | 174/138 F |
| 4,144,404 | 3/1979 | De Groef et al. | 174/88 C |
| 4,174,563 | 11/1979 | Simpson | 29/628 |
| 4,206,786 | 6/1980 | Wetmore | 138/178 |
| 4,237,335 | 12/1980 | Giebel et al. | 174/92 |
| 4,241,234 | 12/1980 | Haeder | 174/77 R X |
| 4,264,780 | 4/1981 | Rolland | 174/DIG. 8 X |
| 4,271,330 | 6/1981 | Watine et al. | 174/78 X |
| 4,282,396 | 8/1981 | Watine et al. | 174/DIG. 8 X |
| 4,341,921 | 7/1982 | Simpson | 174/84 R |
| 4,384,404 | 5/1983 | Watine | 174/78 X |
| 4,424,412 | 1/1984 | Goetter et al. | 174/92 |
| 4,581,265 | 4/1986 | Follette | 428/36 |
| 4,595,724 | 6/1986 | Koblitz | 174/77 R X |
| 4,610,921 | 9/1986 | Follette | 428/304 |
| 4,654,473 | 3/1987 | Roux et al. | 174/77 R X |
| 4,701,574 | 10/1987 | Shimirak et al. | 174/93 |
| 4,809,901 | 3/1989 | Gen et al. | 228/56.3 |

FOREIGN PATENT DOCUMENTS

| | | | |
|---|---|---|---|
| 3329871 | 3/1985 | Fed. Rep. of Germany | 174/78 |
| 913727 | 12/1962 | United Kingdom | 38/1 |

OTHER PUBLICATIONS

Electrical Products Division/3M, 1st Insulate Heat Shrinkable Shield Terminators (no date).
Raychem-Solder Sleeve-Coaxial Cable Terminators; Oct. 1982.
Raychem-Solder Sleeve-MIL-S-83519-Immersion Resistant Shield Terminator (no date).
Military Specification-MIL-S-83519A; Jun. 1984.
Military Specification-MIL-S-83519/1B; (no date).
Military Specification-MIL-S-83519/2A; Jun. 1982.

*Primary Examiner*—Morris H. Nimmo
*Attorney, Agent, or Firm*—Donald M. Sell; Walter N. Kirn; Jack V. Musgrove

[57] ABSTRACT

A shield terminator for sealing the splice of a ground lead wire and the shield of a coaxial cable. The shield terminator includes a solder band and a dam of thermoplastic material which has at least two lumens therein. One larger lumen receives the coaxial cable while the small lumen receives the ground lead wire. The presence of the thermoplastic material around both the cable and the lead wire insures that all interstices between the cable, wire and the sleeve of the shield terminator will be filled, preventing the escape of solder from the sleeve, and precluding entry of water and other contaminants into the splice.

18 Claims, 3 Drawing Sheets

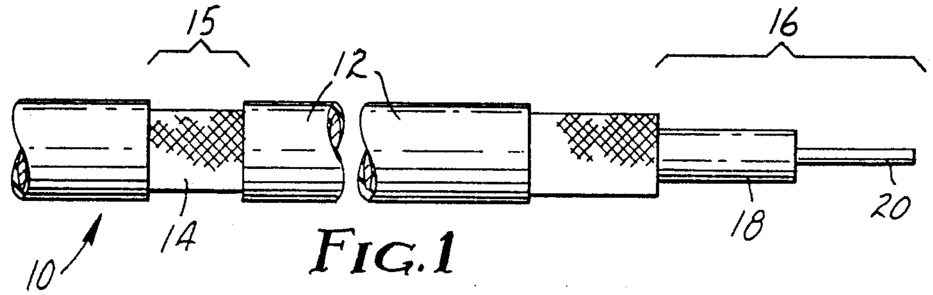
FIG. 1
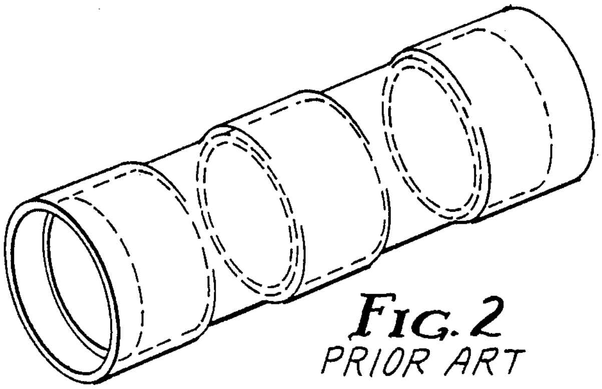
FIG. 2
PRIOR ART
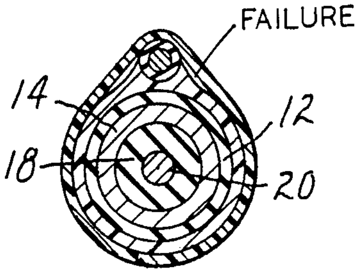
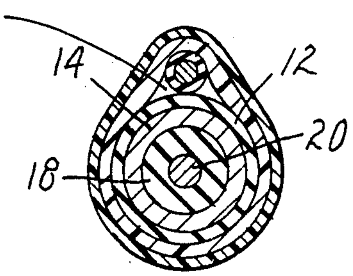
FIG. 4A
PRIOR ART
FIG. 4B
PRIOR ART
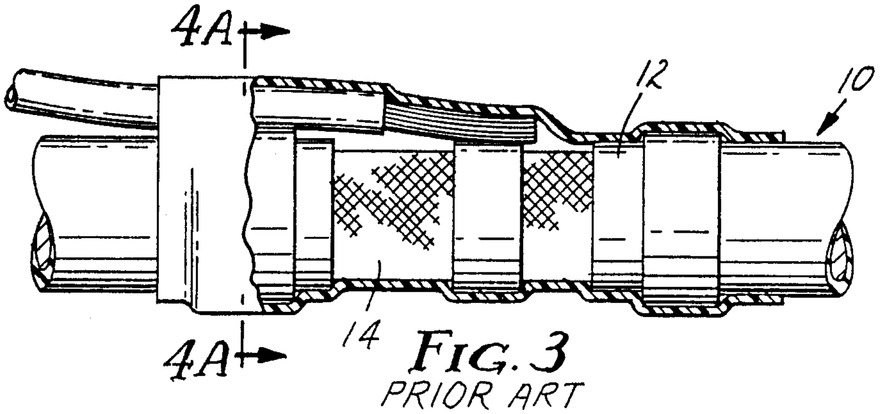
FIG. 3
PRIOR ART

DAM FOR SHIELD TERMINATORS

BACKGROUND OF THE INVENTION

1. Field of the Invention

The present invention generally relates to electrical connectors and cable splicing, and more particularly to a heat-shrinkable shield terminator having a multilumen sealing ring.

2. Description of the Prior Art

There are presently available a wide variety of electrical couplers and splicing devices for connecting wires and cables in electrical systems. The subject invention relates to such a device primarily used in conjunction with coaxial cables.

A typical coaxial cable (also known as a coax, coaxial transmission line, or concentric cable) has a central wire surrounded by an insulating layer, which is further surrounded by a conductive sheath or shield, and an insulating covering or jacket (see FIG. 1). The conductive shield is usually connected to the electrical ground, whether it be earth ground, a chassis, or simply a common tie.

It is sometimes necessary to connect the ground shields of two or more coaxial cables together, often at a point along the coax where it is undesirable to completely cut through the cable. In such cases, a section of the outer jacket may be removed without cutting the remaining layers of the cable, thereby exposing the ground shield. One end of a ground lead wire may then be soldered to the ground shield and the other end connected to the second coax or other ground. Throughout the specification, the term "lead" in the phrase "ground lead wire" is meant in the verb sense, not as the metal lead (Pb). Similarly, the word "ground" is not to be taken in a limiting sense; as noted above, the lead wire may simply be connected to a common tie.

A problem arises, however, with respect to the exposed ground shield. If left bare, the ground wire may accidentally become detached, or environmental influences, particularly water, could corrode the shield, as well as affect the insulative ability of the layer surrounding the central wire. Also, when cables are so exposed in the presence of water (such as underground cables after a rain), the water may seep in between the outer jacket and the inner insulating layer, where it is then conveyed down the cable, sometimes for hundreds of feet. If openings in the inner insulating layer exist, even as small as a pinhole, the water will create a resistive fault in the cable. Even if there are no flaws in the insulating layer, the presence of water will still create a capacitive fault, and alter the impedance characteristics of the coax. Such defects can become critical in certain situations, such as in airborne equipment or combat vehicles.

It is, therefore, necessary to provide an environmental seal around the exposed area of cable. Devices for this purpose are known in the art, and are generally a protective sleeve. They are cylindrical in shape, and are usually constructed of a thermoelastic, or heat-shrinkable material. In this manner, the sleeve may be loosely fitted around the exposed section of cable and heat applied, resulting in a tight seal about the shield ground.

Improved versions of the protective sleeve include a solder band placed midway along the sleeve, and two rings of sealing material, or dams, placed at each end of the sleeve (see FIG. 2). This particular design, known generically as a shield terminator, is disclosed in U.S. Pat. No. 3,312,772 issued to Raychem Corporation on Apr. 4, 1967, which is hereby incorporated by reference. Other related U.S. Pat. Nos. are: No. 3,305,625 issued to R. Ellis; No. 3,316,343 issued to H. Sherlock; No. 3,396,460 issued to J. Wetmore; No. 3,525,799 issued to R. Ellis; No. 4,206,786 issued to J. Wetmore; and No. 4,341,921 issued to D. Simpson. Each of these patents is hereby incorporated by reference.

The shield terminator is slipped around the exposed portion of the cable shield, an the ground lead wire is inserted between the sleeve and dam material (FIG. 3). When heat is applied, the solder melts, eliminating the separate step of soldering the ground lead wire to the ground sheath. At the same time, the sealing material becomes somewhat fluid and, as the thermoelastic material begins to shrink, the sealant should fill any gaps between the ground lead wire and the outer jacket of the cable. Notably, the abovereferenced patent does not disclose use of the sealing material to protect against external influences, but rather contemplates use of the sealant only to keep the solder from flowing out of the protective sleeve. A detailed discussion of desirable performance characteristics and use of these shield terminators may be found in U.S. Department of Defense military specifications MIL-S-83519A, MIL-S-83519/1C and MIL-S-83519/2A, which are hereby incorporated by reference.

Unfortunately, however, the sealing material does not always completely fill the space between the ground lead wire and the outer jacket. Failures sometimes occur at interstices between the sleeve and the ground lead wire, above the dam, as illustrated in FIG. 4A. Alternatively, if the ground lead wire is inserted between the dam material and the cable jacket, failures may occur adjacent to the jacket as shown in FIG. 4B. Such failures completely nullify the effectiveness of the shield terminator, and may lead to catastrophic results under certain conditions. It would, therefore, be desirable and advantageous to devise a shield terminator having improved sealing means which overcomes this deficiency.

Accordingly, the primary object of the present invention is to provide a shield terminator for electrical wires and cables.

Another object of the invention is to provide such a device which has improved sealing means for protection against environmental influences.

Still another object of the invention is to provide a dam for a shield terminator which may be used to interconnect several wires or cables.

SUMMARY OF THE INVENTION

The foregoing objects are achieved in a shield terminator having at least one multilumen dam. In the simplest embodiment, one of the two dams present in the terminator is a bilumen dam, having one lumen or channel for the cable, and another lumen for the lead wire. In this manner, the user is assured of a quality seal encompassing the exposed portion of the cable, and protecting the shield against environmental influences. Where a chain of interconnected cables is required, the shield terminators may include two such bilumen dams, one at each end; alternatively, a trilumen dam may be provided. Dams having more than three lumens are also envisioned as being useful in specific applications.

BRIEF DESCRIPTION OF THE DRAWINGS

The novel features of the invention are set forth in the appended claims. The invention itself, however, will best be understood by reference to the accompanying drawings, wherein:

FIG. 1 is an elevational view of a coaxial cable with a portion of the outer insulating jacket removed, exposing the shield;

FIG. 2 is a perspective view of the prior art shield terminator;

FIG. 3 is a side elevational view with a partial cutout illustrating the prior art shield terminator with the ground lead wire inserted therein;

FIG. 4A is a cross-sectional view taken along lines 4A–4A of FIG. 3 showing failure points along the dam after heat has been applied to the shield terminator;

FIG. 4B is similar to FIG. 4A except that the ground lead wire has been placed under, rather than over, the dam;

DESCRIPTION OF THE PREFERRED EMBODIMENT

Figure 5:
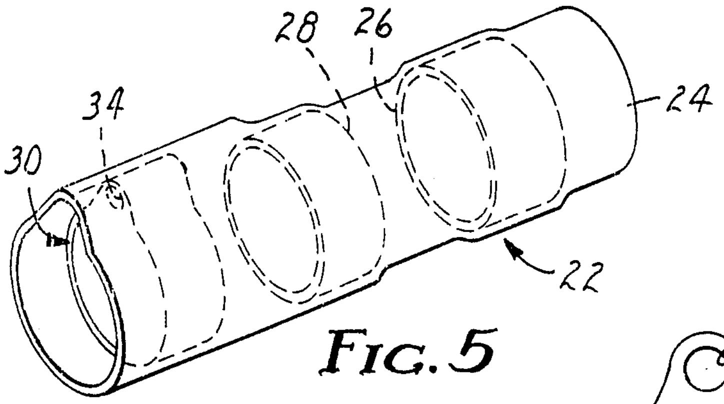
FIG. 5 is a perspective view of one embodiment of the present invention showing a bilumen dam in broken lines.

With reference now to the drawings, and in particular with reference to FIG. 1, there is depicted a conventional coaxial cable 10 with a portion of the outer insulating jacket 12 removed, exposing shield section 14. An annular cut is normally made in the insulating jacket to expose shield section 14, but it is sufficient to cut a smaller "window" of jacket 12 to expose the cable shield. The conductive shield 14 should be woven conductive filaments, normally braided copper wire which is tinned or silvered for solderability. Some shields are wrap-around aluminum sheeting (aluminized Mylar foil), but it is difficult to make a solder bond with such material. Also shown is the terminal end 16 of coaxial cable 10, including inner insulating layer 18 and central wire 20. Of course, those skilled in the art will appreciate that the present invention is not limited to use on coaxial cables, but may be used in any application requiring electrical connection to an insulated conductor.

Although the conductive shield of coaxial cable 10 may be connected to the electrical ground proximate terminal end 16, this is often insufficient for sensitive equipment, especially where shorts or lightning strikes are likely to occur. Therefore, grounding of shield section 14 at an intermediate point 15 such as that shown in FIG. 1 is often desirable. In anticipation of this requirement, several shield terminators of the present invention may be prepositioned about coaxial cable 10, such that they may be conveniently maneuvered along cable 10 to the location of exposed sections 14.

Figure 6:
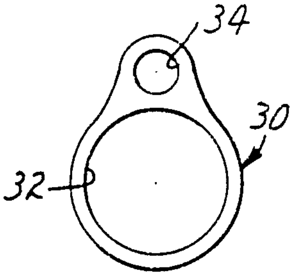
FIG. 6 is a front elevational view of the bilumen dam of the present invention.

Referring now to FIGS. 5 and 6, the shield terminator 22 of the present invention is explained. Shield terminator 22 generally comprises tubular sleeve 24, prior art dam 26, solder band 28, and bilumen dam 30. Sleeve 24 is constructed of a heat-shrinkable material usually formed from polymeric and elastomeric resins. Suitable thermoelastic materials include flexible polyolefins, polychloroprene, polyvinylidene fluoride, polytetrafluoroethylene and fluoroelastomers. Use of polychloroprene is eschewed, however, as it is not transparent (which is desirable for observation of a proper solder joint), and it does not have the heat stability of the other compounds. These substances typically have a shrink ratio of approximately 2:1, meaning that, in tubular form, they may shrink to 50% of their original diameter. Sleeve 24 may therefore easily slide over cable 10, and still provide a tight fit around cable !0 after heating.

Sleeve 24 may come in various sizes according to the diameter of the particular cable being grounded. The thermoelastic material comprising sleeve 24 is optionally color-coded according to diameter, length, thermoelastic material, solder type, etc., and may further contain a thermochromic temperature indicator which causes sleeve 24 to change color when an appropriate temperature is applied, namely, the minimum temperature necessary to melt solder band 28 and plasticize dams 26 and 30.

Dam 26 is a prior art dam, and is essentially a band or ring of thermally stabilized thermoplastic. A material should be chosen which melts when heat (sufficient to melt solder band 28) is applied, but the material should remain somewhat viscous to preclude escape of any solder from sleeve 24. The inventor prefers the use of a mixture of ethylene vinyl acetate copolymer and polyvinylidene fluoride. Solder band 28 is also known in the art, and may be any type of tinlead alloy, with the optional provision of flux. Solder band 28 may be replaced by other fusible bonding materials.

Bilumen dam 30 (shown in FIG. 6) is generally constructed of the same material as prior art dam 26; however, bilumen dam 30 has two separate lumens or holes 32 and 34. The size of bilumen dam 30 (as well as the size of prior art dam 26 and solder band 28) depends on the size of cable 10 and sleeve 24.

Figure 8:
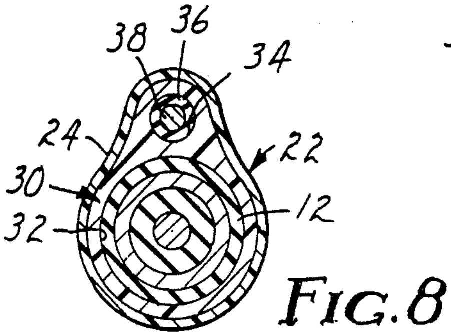
FIG. 8 is a cross-sectional view taken along lines 8—8 of FIG. 7.
Figure 7:
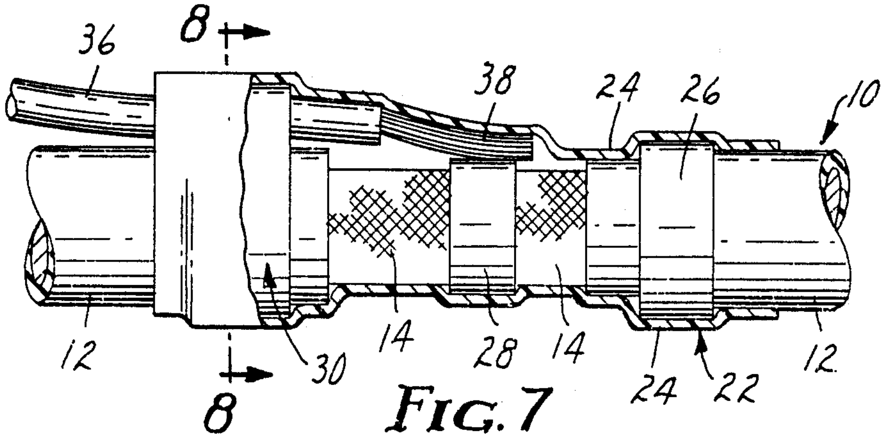
FIG. 7 is a side elevational view with a partial cutout showing the ground lead wire inserted into the shield terminator and bilumen dam.

With further reference to FIGS. 7 and 8, lumen 32 provides for passage of coaxial cable 10, while lumen 34 accommodates ground lead wire 36. FIG. 7 depicts the placement of ground lead wire 36 through lumen 34, with the leads 38 of ground lead wire 36 placed adjacent solder band 28. FIG. 8 in turn illustrates how bilumen dam 30 surrounds both ground lead wire J6 and coaxial cable 10, insuring a complete seal once heat is applied and sleeve 24 shrinks (for clarity, shield 14, inner insulating layer 18 and lead wire 16 have been omitted from FIG. 8). The compression from the sleeve contraction causes bilumen dam 30 to seal about cable jacket 12 and lead wire 36. Heat may be applied by convection, infrared radiation, or any other convenient method. In addition to providing improved sealing ability, bilumen dam 30 also affords greater strain relief for the electrical connection.

Figure 9:
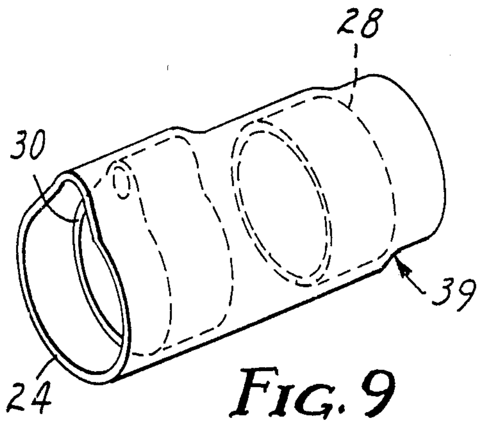
FIG. 9 is a perspective view of the capped shield terminator of the present invention.

It is contemplated that shield terminator 22 may be sold either with or without ground lead wire 36 in place. In other words, lead wire 36 may be inserted into lumen 34 before packaging, simplifying installation of the device. Also, if a ground connection is desired at the terminal end 16 of cable 10, rather than at some intermediate segment as heretofore discussed, shield terminator 22 can have a variable diameter, i.e., the diameter of sleeve 24 at prior art dam 26 will be smaller than at bilumen dam 30 in order to fit more tightly around the internal insulating layer 18 of cable 10. Additionally, if a connection needs to be made to the terminal end of a plain wire such as plastic insulated cable (PIC), rather than on a coaxial cable, then shield terminator 22 may take the form of a cap 39, such as that shown in FIG. 9, having only bilumen dam 30 and solder band 28 therein.

Figure 10:
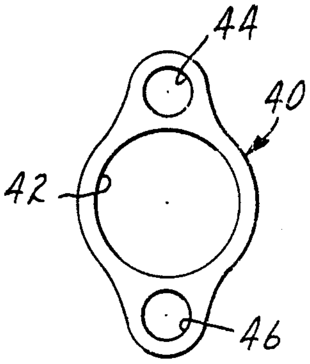
FIG. 10 is a front elevational view of the trilumen dam embodiment of the present invention.
Figure 11:
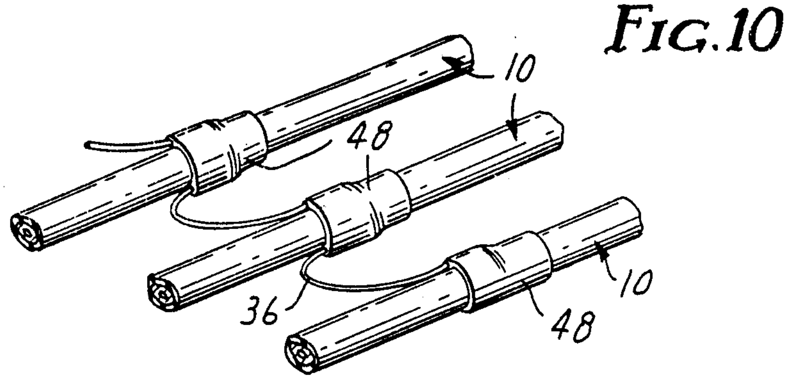
FIG. 11 is a perspective view depicting use of the trilumen dam in a chain arrangement.

In certain applications, it is necessary to create a "chain" of connected lead wires to guarantee a common ground for several cables. In such a case, it is useful to have two ground lead wires connected to a single cable shield. This arrangement may be facilitated by the use of two bilumen dams 30 in shield terminator 22, one at each end. Alternatively, a trilumen dam 40, such as that shown in FIG. 10, may be employed. Trilumen dam 40 is simply substituted for bilumen dam 30 in shield terminator 22. Trilumen dam 40 has a first lumen 42 for passage of cable 10, and second and third lumens 44 and 46 which receive the two ground lead wires. FIG. 11 depicts a chain of cables connected by means of the trilumen dam shield terminators 48. As those skilled in the art will appreciate, dams having more than three lumens will also be useful where it is necessary to connect more than two ground wires to the cable.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that the appended claims will cover such modifications that fall within the true scope of the invention.

We claim:

1. A device for encapsulating an exposed portion of a conductor in an insulated cable and a lead wire connection, comprising:

sleeve, means for surrounding the exposed portion of the conductor, said sleeve means having first and second ends;

means for electrically connecting the exposed portion of the conductor to the lead wire, said connecting means being within said sleeve means and positioned intermediate said first and second ends thereof; and a first thermoplastic dam for sealing the device against environmental influences upon the application of heat having at least two lumens, said first dam being positioned within said sleeve means proximate said first end thereof.

2. The device of claim 1 wherein said first thermoplastic dam has first and second lumens, said first lumen having a diameter approximately equal to the diameter of the cable, and said second lumen having a diameter approximately equal to the diameter of the lead wire.

3. The device of claim 1 wherein said connecting means comprises a fusible solder band positioned within said sleeve means intermediate said first and second ends thereof; and further comprising a second thermoplastic dam positioned within said sleeve means proximate said second end thereof.

4. The device of claim 3 wherein said sleeve means is a tubular member formed of thermoplastic material whereby, when the cable is inserted in said first lumen, the lead wire is inserted in said second lumen, and heat is applied to the device, said tubular member shrinks tightly about the exposed portion of the conductor, said solder band melts and connects the lead wire to the exposed portion of the conductor, and said first dam fills interstices between said tubular member, the lead wire, and the cable.

5. The device of claim 4 wherein said thermoelastic material forming said tubular member is selected from the group consisting of polyolefin, polyvinylidene fluoride, polytetrafluoroethylene or a fluoroelastomer.

6. The device of claim 5 wherein said thermoplastic material forming said first and second dams is a mixture of ethylene vinyl acetate copolymer and polyvinylidene fluoride.

7. The device of claim 3 wherein said first dam has a third lumen for receiving another lead wire.

8. The device of claim 2 wherein:

said second end of said sleeve means is capped; and said connecting means comprises a fusible solder band positioned within said tubular member intermediate said first and second ends thereof. band positioned within said tubular member intermediate said first and second ends thereof; and said dam means comprises a dam having said first and second lumens therein, said dam being positioned within said tubular member proximate said first end thereof.

9. A shield terminator for encapsulating an exposed portion of a shield in a coaxial cable and a lead wire adjacent to the exposed portion of the shield, the shield terminator comprising:

a thermoelastic tubular sleeve having first and second ends;

a solder band positioned within said tubular sleeve intermediate said first and second ends; and first and second thermoplastic dams for sealing the terminator against environmental influences upon the application of heat positioned, respectively, at said first and second ends of said tubular sleeve, said first dam having at least two lumens therein for receiving a cable and a lead wire.

10. The shield terminator of claim 9 wherein:

said thermoelastic tubular sleeve is formed of material selected from the group consisting of polyolefin, polyvinylidene fluoride, polytetrafluoroethylene or a fluoroelastomer; and said thermoplastic dams are a mixture of ethylene vinyl acetate copolymer and polyvinylidene fluoride.

11. A dam for a shield terminator used to encapsulate an exposed portion of a conductor in an insulated cable and a lead wire adjacent to the exposed portion of the conductor, the dam comprising a ring of thermoplastic material having first and second lumens therein, said first lumen having a diameter approximately equal to the diameter of the cable to be encapsulated, and said second lumen having a diameter approximately equal to the diameter of the lead wire to be encapsulated.

12. The dam of claim 11 wherein said thermoplastic material is a mixture of ethylene vinyl acetate copolymer and polyvinylidene fluoride.

13. A method of manufacturing a shield terminator used to encapsulated an exposed portion of a conductor in an insulated cable, a lead wire being adjacent to the exposed portion of the conductor, comprising the steps of:

obtaining a tubular sleeve member having first and second ends;

positioning a first dam member in said sleeve member proximate said first end, said first dam member having at least first and second lumens therein, said first lumen having a diameter approximately equal to the diameter of the cable to be installed and said second lumen having a diameter approximately equal to the diameter of the lead wire to be installed; and inserting fusible bonding means in said sleeve member intermediate said first and second ends.

14. The method of claim 13 further comprising the step of placing a second dam member in said sleeve member proximate said second end.

15. The method of claim 13 further comprising the step of introducing the lead wire into said second lumen of said first dam member.

16. The method of claim 13 further comprising the step of capping said second end of said sleeve member.

17. A method of using a thermoplastic shield terminator to connect an exposed portion of a conductor in an insulated cable to a terminal end of a lead wire, the shield terminator having at least one multilumen dam and fusible bonding means therein, comprising the steps of:

positioning the shield terminator about the exposed portion of the conductor by inserting the cable through a first lumen in the multilumen dam, the fusible bonding means being located adjacent to the exposed portion of the conductor;

inserting the lead wire to be installed in a second lumen in the multilumen dam, placing the terminal end of the lead wire proximate the fusible bonding means; and heating the shield terminator until the fusible bonding means flows between the lead wire and the exposed portion of the conductor.

18. The method of claim 17 further comprising the step of introducing another lead wire into a third lumen of the multilumen dam, said introducing step occurring before said heating step.

* * * * *

UNITED STATES PATENT AND TRADEMARK OFFICE
CERTIFICATE OF CORRECTION

PATENT NO. : 4,965,410

DATED : October 23, 1990

INVENTOR(S) : Robert J. Spector

It is certified that error appears in the above-identified patent and that said Letters Patent is hereby corrected as shown below:

Column 1, Line 35, "not" should be underlined -- not --

Column 4, Line 51, "lead wire J6" should read -- lead wire 36 --

Column 5, Line 40, "sleeve," delete the comma -- sleeve --

Column 5, Line 66, "thermoplastic" should read -- thermoelastic --

Column 6, Line 21, after "thereof." delete -- band positioned within said tubular member intermediate said first and second ends thereof; and said dam means comprises a dam having said first and second lumens therein, said dam being positioned within said tubular member proximate said first end thereof. --

Column 6, Line 43, "of material" should read -- of a material --

Column 6, Line 63, "encapsulated" should read -- encapsulate --

Column 7, Line 19, "thermoplastic" should read -- thermoelastic --

Column 8, Line 5, after "conductor" insert -- to be installed --

Signed and Sealed this

Twenty-fifth Day of February, 1992

*Attest:*

HARRY F. MANBECK, JR.

*Attesting Officer* *Commissioner of Patents and Trademarks*